United States Patent [19]

Elks et al.

[11] 3,875,148
[45] Apr. 1, 1975

[54] 9α-UNSUBSTITUTED-11β-BROMO-19-NORSTEROIDS

[75] Inventors: Joseph Elks, London; Gordon Hanley Phillipps, Greenford; Alan Tulley, Southport; Leslie Stephenson; Margaret Elizabeth Hill, both of London, all of England

[73] Assignee: Glaxo Laboratories, Greenford, England

[22] Filed: Feb. 19, 1974

[21] Appl. No.: 443,386

Related U.S. Application Data

[63] Continuation of Ser. No. 161,949, July 9, 1971, abandoned, which is a continuation of Ser. No. 795,064, Jan. 29, 1969, abandoned.

[52] U.S. Cl..................260/239.5, 260/239.55 R, 260/239.55 C, 260/397.3, 260/397.45, 260/397.5
[51] Int. Cl.......................................... C07c 173/00
[58] Field of Search................................. 260/239.5

Primary Examiner—Elbert L. Roberts
Attorney, Agent, or Firm—Bacon & Thomas

[57] ABSTRACT

9α-unsubstituted-11β-bromo-19-nor-steroids having hormonal activity and a process for preparing same by reacting the corresponding 11α-hydroxy steroid with a. a reagent of the formula

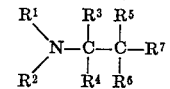

where
R$^1$ and R$^2$ are alkyl groups having 1–8 carbon atoms or aralkyl or aryl groups or, together with the nitrogen atom to which they are attached, comprise a heterocyclic radical;
R$^3$ is a bromine or fluorine atom;
R$^4$ is a bromine or fluorine atom and R$^5$ is hydrogen or R$^4$ and R$^5$ together represent a carbon-carbon bond;
R$^6$ is a chlorine, bromine or fluorine atom and
R$^7$ is a chlorine, bromine or fluorine atom or a trifluoromethyl group, the reaction being effected in the presence of bromide ions when neither R$^3$ nor R$^4$ is bromine; or (b) with a triaryl-phosphine or -phosphite and bromine or bromalkane.

10 Claims, No Drawings

9α-UNSUBSTITUTED-11β-BROMO-19-NORSTEROIDS

This application is a continuation of application Ser. No. 161,949, filed July 9, 1971 and now abandoned, which is in turn a continuation of application Ser. No. 795,064, filed Jan. 29, 1969 and also now abandoned.

The present invention relates to novel bromine-substituted steroids and to a process for their preparation.

The copending U.S. patent application of Joseph Elks et al., Ser. No. 656,665, filed July 28, 1967 and abandoned in favor of a continuation-in-part application Ser. No. 701,064, filed January 29, 1968, which was in turn abandoned in favor of a continuation-in-part application Ser. No. 846,975, filed Aug. 1, 1969 and now U.S. Pat. No. 3,665,021 describes 9α-unsubstituted-11β-chloro-19-nor-steroids having hormonal activity, particularly progestational or anabolic activity which may carry various ring substituents, for example in the 17-position a hydroxyl group, a protected hydroxyl group, an oxo group, or a protected oxo group, or an aliphatic, araliphatic, acyl or acyloxyacyl group in the presence or absence of a hydroxyl or protected hydroxyl or protected hydroxyl group; in the 16-position a methyl, methylene or methoxy group; in the 6-position a chlorine or fluorine atom or a methyl group; in the 3-position an oxo, protected oxo, hydroxyl or protected hydroxyl group. The carbon atoms in the 16- and 17-positions may carry an epoxide or methylene group or form part of a 1'-pyrazolino-(4',3':16α,17α)-grouping or a 2'-pyrazolino-(4',5':16α,17α) grouping. The steroids may possess double bonds; for example, the A-ring may be fully aromatic or may possess double bonds in the 1,2-position and/or the 4,5-position. The B-ring may also be unsaturated, for example with a double bond in the 5,6- or 6,7-position. The D-ring may possess a double bond in the 16,17-position. In general the 4- and 16-positions are preferably unsubstituted and the A, B and C rings are preferably not condensed with further rings.

Where acyloxy groups are present these may be substituted or unsubstituted aliphatic, cycloaliphatic, araliphatic or aryl acyloxy groups, for example acetoxy, propionyloxy, valeryloxy, hexahydrobenzoyloxy, β-phenylpropionyloxy or benzoyloxy groups.

Other protected hydroxyl groups include ethers, e.g. alkoxy groups having 1–5 carbon atoms, or aralkoxy or aryloxy groups, especially arylmethoxy groups such as benzyloxy groups. Protected oxo groups include ketal groups, e.g., ethylenedioxy groups and enol ether groups such as enol methyl ether groups or enol ethyl ether groups.

The aliphatic groups which may be present in the 17-position preferably contain 1–9 carbon atoms and may, for example, be substituted or contain unsaturation. Substituents which may be present include for example, halogen atoms (e.g. chlorine) or hydroxy or acyloxy groups. Useful aliphatic substituents thus include methyl, ethyl, propyl, vinyl, 2-methyl-prop-2-enyl, 1-methyl-prop-2-enyl, but-2-enyl, allyl, ethynyl, chloroethynyl groups etc.

Particularly useful steroids according to the invention include the 3-oxo-Δ⁴-11β-chloro-19-nor-steroids and 11β-chlorooestr-4-ene-3,17-dione, while possessing hormonal activity, is especially useful as an intermediate in the preparation of related compounds having other substituents in the 3- and/or 17- positions.

Further particularly interesting compounds include 17α-acetoxy-11β-chloro-19-nor-pregn-4-ene-3,20-dione; 11β-chloro19-nor-pregn-4-ene-3,20-dione; 17α-acetoxy-3-ethoxy-6,11β-dichloro-19-nor-pregna-3,5-dien-20-one; 17α-acetoxy-6,11β-dichloro-19-nor-pregna-4,6-diene-3,20-dione; 17α-acetoxy-6α,11β-dichloro-19-nor-pregn-4-ene-3,20-dione; 11β-chloro-3-ethoxy-17α-ethynyloestra-3,5-dien-17β-ol; 11β-chloro-17α-ethynyl-17β-hydroxy-3-methoxyoestra-3,5-diene; 17α-ethynyl, 17α-allyl-, 17α(2-methyl-prop-2-enyl)-, 17α-(1-methyl-prop-2-enyl)- and 17α-but-2-enyl- 11β-chloro-17β-hydroxy-oestr-4-en-3-one; 11β-chloro-17α-ethynyl-17β-hydroxy-oestra-4,6-dien-3-one; 6,11β-dichloro-17α-ethynyl-17β-hydroxyoestra-4,6-dien-3-one; 6α,11β-dichloro-17α-ethynyl-17β-hydroxyoestr-4-en-3-one; 3,17α-diacetoxy-11β-chloro-19-nor-pregna-3,5-dien-20-one; 17α-propionyloxy-11β-chloro-19-nor-pregn-4-ene-3,20-dione; 17α-acetoxy-11β-chloro-19-nor-pregna-4,6-diene-3,20-dione; 11β-chloro- 19-norpregna-4,16-diene-3,20-dione; 11β-chloro-16α-methoxy-19-nor-pregn-4-ene-3,20-dione; 11β-chloro-1'-pyrazolino-(4',3':16α,17α) - 19-nor-pregn-4-ene-3,20-dione; 11β-chloro-2'-pyrazolino-(4',5':16α,17α)-19-nor-pregn-4-ene-3,20-dione; 11β-chloro-16-methyl-19-norpregna-4,16-diene-3,20-dione; 11β-chloro-17α-hydroxy-16-methylene-19-norpregn-4-ene-3,20-dione and its 17-acetate; 11β-chloro-17α-chloroethynyl-17β-hydroxy-oestr-4-en-3-one; 6,11β-dichloro-3-ethoxy-17α-ethynyl-17β-hydroxy-oestr-3,5-diene.

We have now found that 9α-unsubstituted -11β-bromo-19-nor-steroids, which are a new class of compounds, also possess similar hormonal activity, for example progestational or antioestrogenic activity.

According to the present invention therefore we provide 9α-unsubstituted-11β-bromo-19-nor-steroids.

The new steroids according to the invention may carry various ring substituents, for example in the 17-position a hydroxyl group, a protected hydroxyl group, an oxo group, or a protected oxo group, or an aliphatic, araliphatic, acyl or acyloxyacyl group in the presence or absence of a hydroxyl or protected hydroxyl group; in the 16-position a methyl, methylene or methoxy group; in the 6-position a chlorine or fluorine atom or a methyl group; in the 3-position an oxo, protected oxo, hydroxyl or protected hydroxyl group. By the terms "protected hydroxyl group" and "protected ketone group" we mean such groups as acyloxy, ether, ketal or enol ether groups which can be re-converted into hydroxyl or oxo groups. Alternatively, such protected groups may be required in the end product and may be allowed to remain. The carbon atoms in the 16-and 17-positions may carry an epoxide or methylene group or form part of a 1'-pyrazolino-(4',3':16α,17α)-grouping or a 2'-pyrazolino-(4',5':16α,17α) grouping. The steroids may possess double bonds; for example, the A-ring may be fully aromatic or may possess double bonds in the 1,2-position and/or the 4,5-position. The B-ring may also be unsaturated, for example with a double bond in the 5,6- or 6,7-position. The D ring may possess a double bond in the 16,17-position. In general the 4- and 16- positions are preferably unsubstituted and the A, B and C rings are preferably not condensed with further rings.

Where acyloxy groups are present these may be substituted or unsubstituted aliphatic, cycloaliphatic, araliphatic or aryl acyloxy groups for example acetoxy, propionyloxy, valeryloxy, hexahydrobenzoyloxy, β-phenylpropionyloxy or benzoyloxy groups.

Other protected hydroxyl groups include ethers, e.g. alkoxy groups having 1–5 carbon atoms, or aralkoxy or aryloxy groups, especially arylmethoxy groups such as benzyloxy groups. Protected oxo groups include ketal groups, e.g. ethylenedioxy groups and enol ether groups such as enol methyl ether groups or enol ethyl ether groups.

The aliphatic groups which may be present in the 17-position preferably contain 1–9 carbon atoms and may, for example, be substituted or contain unsaturation. Substituents which may be present include for example, halogen atoms (e.g. chlorine) or hydroxy or acyloxy groups. Useful aliphatic substituents thus include methyl, ethyl, propyl, vinyl, 2-methyl-prop-2-enyl, 1-methyl-prop-2-enyl, but-2-enyl, allyl, ethynyl or chloroethynyl groups.

Particularly useful steroids according to the invention include the 3-oxo-$\Delta^4$-11β-bromo-19-nor-steroids and 11β-bromo-oestr-4-ene-3,17-dione, while possessing hormonal activity, is especially useful as an intermediate in the preparation of related compounds having other substituents in the 3- and/or 17-positions.

Further particularly interesting compounds include 17α-acetoxy-11β-bromo -19-nor-pregn-4-ene-3,20-dione and 11β-bromo-17α-ethynyl-17β-hydroxy-oestr-4-en-3-one.

These compounds have shown oral progestestional and antioestrogenic activity of the same order as that of the corresponding 11β-chloro-compounds.

The new steroids according to the invention may be prepared in any convenient way. According to a still further feature of the invention there is provided a process for the preparation of 9α-unsubstituted-11β-bromo-19-nor-steroids in which a 9α-unsubstituted-11α-hydroxy-19-nor-steroid is reacted (a) with a reagent of the general formula

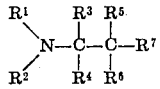

I where
R$^1$ and R$^2$, which may be the same or different, are alkyl groups having 1–8 carbon atoms or aralkyl or aryl groups or, together with the nitrogen atom to which they are attached, comprise a heterocyclic radical which may, if desired, contain further hetero-atoms,
R$^3$ is a bromine or fluorine atom,
R$^4$ is a bromine or fluorine atom, and
R$^5$ is hydrogen or R$^4$ and R$^5$ together represent a carbon-carbon bond;
R$^6$ is a chlorine, bromine or fluorine atom and
R$^7$ is a chlorine, bromine or fluorine atom or a trifluoromethyl group, the reaction being effected in the presence of bromide ions when neither R$^3$ nor R$^4$ is bromine; or (b) with a triaryl-phsophine or -phosphite and bromine or a bromoalkane.

While it is not wished to be bound by theoretical considerations it is believed that the reagent of formula I reacts with the 11α-hydroxy group to form an intermediate ether with liberation of HR$^3$ or HR$^4$, and hence of a bromide or fluoride ion. The bromide ion present is more strongly nucleophilic than the fluoride ion so that even when neither R$^3$ nor R$^4$ is bromine, reaction in the presence of bromide ions results in the introduction of bromine at the 11-position.

The reactions according to the invention are particularly useful because no methods have previously been described for the preparation of 11β-bromo-19-nor-steroids with a 9α-hydrogen atom and the method previously proposed for production of the analogous 11β-fluoro-steroids in the 10-methyl series having a 9α-hydrogen atom tends to give the 9,11 unsaturated product.

The source of bromide ions in the variation of reaction(a) in which neither R$^3$ nor R$^4$ is bromine is preferably a salt soluble in organic solvents but the cationic portion should be inert to the reagent of formula I, for example the cation of a tertiary or quaternary nitrogen base, e.g. triethylamine, trimethylamine, pyridine, collidine, tetrabutylammonium hydroxide etc. In general, however, the preferred source of bromide ions is lithium bromide.

The preferred reagents of formula I in which neither R$^3$ nor R$^4$ is bromine, include N-(2-chloro-1,1,2-trifluoroethyl) diethylamine, N-(1,1,2,2-tetrafluoroethyl)diethylamine, N-(2-chloro-1,1,2-trifluoroethyl)-dimethylamine, N-(2-chloro-1,1,2-trifluoroethyl)dipropylamine, N-(2-chloro-1,1,2-trifluoroethyl)-diisobutylamine, N-(2-chloro-1,1,2-trifluoroethyl)-diisobutylamine, N-(2-chloro-1,1,2-trifluoroethyl)methylethylamine, N-(2,2-dichloro-1,1-difluoroethyl) diethylamine, N-(1,1,2,3,3,3-hexafluoropropyl)diethylamine and N-(1,1,2,2-tetrafluoroethyl)diisopropylamine. The reagent of choice is N-(2-chloro-1,1,2-trifluoroethyl)-diethylamine.

The reaction is preferably effected in an inert solvent that is any solvent which does not react with the reagent of formula I, for example an aromatic or aliphatic hydrocarbon, a halogenated hydrocarbon, an ester, ketone, nitrile or ether or a tertiary alcohol. Examples of such solvents are benzene, toluene, chlorobenzene, methylene chloride, pentane, hexane, cyclohexane, ethyl acetate, butyl acetate, acetonitrile, acetone, methyl ethyl ketone, tetrahydrofuran, diethyl ether, diethylene glycol dimethyl ether, t-butyl alcohol or t-amyl alcohol, and the like. The solvent of choice are methylene chloride, and tetrahydrofuran.

Unless further bromine substituents are required, primary or secondary hydroxyl groups initially present in the steriod should be protected, for example by esterification, etherification etc.

A particular example of reaction (b) is that using triphenylphosphine in bromotrichloromethane.

Particularly preferred starting compounds are the 11a-hydroxy-3-oxo-$\Delta^4$- or -$\Delta^{4,6}$-19-nor-steroids; of these 11α-hydroxyoestr-4-ene-3,17-dione is of especial interest in view of the importance of the corresponding 11β-bromo-compound.

The 9α-unsubstituted-11α-hydroxy-19-nor-steriods may be prepared in any convenient way. Thus, for example, the 11α-hydroxy group may be introduced into a 19-nor-steriod having no 11-substituent by microbiological methods e.g. using organisms such as *Aspergillus ochraceus* and *Rhizopus nigricans*.

The preferred method of preparing the 11α-hydroxy steriods used as starting compounds is to react a 9-dehydrosteroid with diborane followed by reaction of the boron complex so formed with, for example, alkaline hydrogen peroxide as described in our published Dutch Patent A further starting material which is particularly useful is 11α,17α-dihydroxy-19-norpregn-4-ene-3,20-dione which may be prepared by the process described in our said earlier patent application. It will be noted that the 17α-hydroxyl group, being attached to a tertiary carbon atom, is not replaced by bromine in the reaction with the reagent of formula I.

$\Delta^4$-11β-Bromo-19-nor-steroid-3,17-diones prepared by the foregoing process can be treated further to introduce various groupings at the 17-position, where necessary after selective protection of the 3-oxo-group. Thus, for example it is possible to convert to the corresponding 3-enol ether, e.g. by reaction with an enol-etherifying agent such as a gem-dialkoxy-alkane e.g. 2,2-dimethoxypropane or an alkyl orthoformate, e.g. methyl or ethyl orthoformate, in the presence of acid, e.g. a mineral acid such as hydrochloric or sulphuric acid or an organic acid such as toluene-p-sulphonic acid, sulphosalicylic acid or benzene sulphonic acid. The double bonds in the enol ether are in the 3- and 5(6)-positions. Other methods of protecting the 3-oxo-group include formation of a ketal such as an ethylene, propylene or butylene ketal or a hydrazone such as semicarbazone, phenylhydrazone etc. The nature of the protecting system will clearly be chosen having regard to the subsequent reactions which are to be effected.

The 3-enol ethers may then, for example, be reduced e.g. with a borohydride reducing agent, such as an alkali metal borohydride e.g. sodium, potassium or lithium borohydride, to convert the 17-oxo group to hydroxyl. The 17-hydroxy-3-enol ether can then be converted to the corresponding 3-oxo-$\Delta^4$-steroid by hydrolysis e.g. with a mineral acid such a hydrochloric, hydrobromic or sulphuric acid. If desired, the 17-hydroxy group can be acylated before or after hydrolysis of the enol ether grouping e.g. with an acylating reagent such as an acyl halide or anhydride, for example acetic or propionic anhydride or acetyl or propionyl chloride or bromide.

The 17-oxo-3-enol ethers can also be reacted with organometallic reagents to introduce a 17α-hydrocarbon substituent together with a 17β-hydroxy group. Thus, for example, an acetylide, e.g. an alkali metal acetylide, such as sodium or potassium acetylide, may be used to give the extremely useful 17α-ethynyl-17β-hydroxy derivatives or reaction with a Grignard reagent, e.g. an aliphatic magnesium chloride, bromide or iodide, may be used to give the 17α-aliphatic-17β-hydroxy-compound e.g. a 17α-methyl derivative or the corresponding 17α-allyl, 2-methyl-prop-2-enyl, 1-methyl-prop-2-enyl or but-2-enyl compounds. Again the 17-hydroxygroup can, if desired, be acylated before or after hydrolysis of the enol ether grouping.

The 3-oxo steroids can be converted into the corresponding enol esters by reaction with an acylating agent, such as an anhydride e.g. acetic or propionic anhydride, in the presence of an acid e.g. perchloric acid, toluene-p-sulphonic acid or sulphosalicylic acid. The reaction may be effected in an inert organic solvent, e.g. a hydrocarbon, halogenated hydrocarbon or ester solvent, or an excess of the anhydride may be used as solvent. This reaction, as applied to 3-oxoΔ$^4$-steroids, leads to the corresponding 3-acyloxy-$\Delta^{3,5}$-steroids.

Where there is a free hydroxyl group present, e.g. at the 17-position, this may be acylated simultaneously.

If desired, the 3-oxo and/or 17-oxo group can be reduced to hydroxyl, for example using a borohydride reducing agent, e.g. sodium, potassium or lithium borohydride, and acylation using an appropriate acyl anhydride or halide will yield the corresponding 3- and/or 17-acyloxy derivative, for example the acetate or benzoate. The borohydride reduction can be carried out in the presence of a conjugated double bond and, for example, $\Delta^4$-3-ketones can be reduced in this way.

Where it is desired to produce the 3-and/or 17-acyloxy compounds according to the invention or the corresponding 3- and/or 17- ethers, these can be prepared by reaction of the corresponding 3- and/or 17-hydroxy steroids or 3-oxosteroids with an acylating agent for example an acyl halide or anhydride, e.g. acetic, propionic or benzoic anhydride or chloride, or an etherifying agent for example or alkyl or aralkyl halide, sulphate or arylsulphonate. 3-Oxo steroids may, of course, form the corresponding enol or dienol ethers or esters as indicated above.

6β-Chloro-3-oxo-$\Delta^4$-steroids according to the invention can be prepared by the methods described in our said earlier application Ser. No. 701,064 wherein it is disclosed that the corresponding compounds of that application can be prepared by reaction of a 3-acyloxy or 3-alkoxy-$\Delta^{3,5}$-11β-chloro-19-nor-steroid with a chlorinating agent such as molecular chlorine preferably in the presence of a carboxylic acid such as acetic, propionic or pivalic acid and a tertiary base such as trimethylamine, triethylamine or pyridine, or with an N-chloro-amide or -imide e.g. N-chlorosuccinimide, or N-chloro-acetamide, preferably in the presence of an inorganic or organic base, e.g., an alkali metal acetate such as sodium or potassium acetate or a tertiary amine such as triethylamine, trimethylamine or pyridine in the presence of a carboxylic acid such as acetic, propionic or pivalic acid. The 3-acyloxy group may, for example, be a 3-benzoyloxy or 3-acetoxy group, and the 3-alkoxy group may, for example, be a methoxy or ethoxy group.

3-Oxo-$\Delta^{4,6}$-steroids according to the invention can be prepared by reaction of a corresponding 3-acyloxy or 3-alkoxy-$\Delta^{3,5}$-steroid with a reagent capable of converting an enol ether or ester into a conjugated ketone, for example chloranil or manganese dioxide.

17α-Acyloxy-3-keto-$\Delta^4$-steroids according to the invention may be obtained from the corresponding 3β, 17α-diacyloxy-$\Delta^{3,5}$-steroids by selective hydrolysis at the 3-position e.g. using a basic reagent such as an alkali metal hydroxide, e.g. sodium or potassium hydroxide, or an acidic reagent, e.g. an organic or mineral acid preferably in a polar solvent medium such as methanol, ethanol, dioxan, tetrahydrofuran etc.

Alternatively the 17-hydroxy-3-keto-$\Delta^4$-steroids according to the invention can be converted into the 17-acyloxy-3-keto-$\Delta^4$-steroids without attack at the 3-position by reaction with trifluoroacetic ahydride and the appropriate acid, for example, a lower aliphatic acid such as acetic or propionic acid.

17β-acyl-$\Delta^{16}$-steroids according to the invention may be prepared by the methods described in our copending application Ser. No. 701,064 wherein it is disclosed that the corresponding compounds of that application may be prepared from the corresponding 17β-acyl-17α-hydroxy steroids by reaction with semicarbazide followed by cleavage e.g. by reaction of the resulting product with pyruvic acid. A 3-keto-$\Delta^4$-system will not be changed by this reaction sequence. This reaction does, however, also produce the 16α-methoxy-17β-acyl compounds when methanol is used as solvent. The two types of compound may be separated by conventional methods, for example preparative thin layer chromatography, the 16α-methoxy compound being in the more polar fractions.

The use of reagents of formula I in which neither $R^3$ nor $R^4$ is bromine in the presence of bromide ions for the replacement of a hydroxyl group by bromine is, to our knowledge, new. According to a further feature of the present invention, therefore, we provide a general process for the preparation of bromine substituted steroids in which a steroid primary or secondary alcohol is reacted with a compound of general formula I (in which $R^1$, $R^2$, $R^5$, $R^6$ and $R^7$ have the above meanings, $R^3$ is fluorine and $R^4$ is fluorine or together with $R^5$ forms a carbon-carbon bond) in the presence of bromide ions. The source of bromide ions and other reaction conditions are preferably those particularised above for reaction with 11α-hydroxy-19-nor-steroids. The reaction may be applied to replacement of hydroxyl by bromine in a variety of steroid alcohols and thus, for example, 3α-bromo-5α-cholestane may be obtained from cholestan-3β-ol in this way.

According to a still further feature of the invention we provide pharmaceutical compositions comprising one or more 9α-unsubstituted-11β-bromo-19-nor-steroids together with a pharmaceutical carrier or excipient and/or one or more further active compounds e.g. hormones. Compounds having progestational activity may advantageously be formulated in conjunction with one or more hormones having oestrogenic activity.

The compositions according to the invention are intended for administration to both humans and animals. The term "pharmaceutical" as used herein to describe compositions and carriers means therefore that these are of use in both human and veterinary medicine.

The compositions are preferably in the form of dosage units and may be formulated for daily oral administration in such forms as tablets, capsules, sachets etc., either for taking directly or with a draught. Suppositories for rectal adsorption may also be employed. Injection preparations may be formulated, preferably for more prolonged action, while implantation pellets may be formulated having the advantage of requiring very infrequent administration.

Conventional pharmaceutical excipients for solid preparations may for instance include sugar alcohols, sugars, starch, magnesium stearate, gelatin, polyethylene glycols and suitable colouring agents. Tablets may be coated for protection, colour distinction or elegance by conventional methods such as film coating or sugar or pearl coating. Suppositories may be prepared, using conventional bases such as glyco-gelatin, cocoabutter, or water-dispersible bases with a melting point above body temperature, such as polyglycols.

For injection purposes, preparations for intramuscular or subcutaneous administration may be prepared in conventional sterile oily, aqueous or emulsion bases, in solution and/or suspension. Vehicles preferably include physiologically acceptable vegetable oils, e.g. arachis oil, fractionated coconut oil; oily esters, e.g. isopropyl-myristate; non-aqueous solvents, e.g. propylene glycol; aqueous vehicles such as sterile water or physiological saline; together with suitable formulatory agents such as suspending agents, e.g. aluminum stearate for oily materials, carboxymethyl cellulose for aqueous preparations; physiologically acceptable emulsifying agents, e.g. "Tween"81, buffering agents for pH control, antioxidants, stabilising and solubilising agents. The injections may be formulated for immediate use, or as a dry powder for re-constitution before use with a separate vehicle. Unit injections required for prolonged action, e.g. 1 month's duration, would naturally contain an increased quantity of active material.

Each dosage unit for daily administration to humans preferably contains 0.5 to 5.0 mg. active material according to the invention, advantageously 0.2 to 2.0 mg.

Implantation pellets would in general contain a much higher dosage to cover prolonged activity for preferably several months. Implants may be prepared aseptically from a sterile material, by fusion or heavy compression, preferably without the addition of other substances.

For veterinary use in particular, long acting vaginal inserts such as tampons and pessaries may be prepared in a conventional manner. The dosage required for animal treatment will of course, vary according to the animal.

The following Examples are given by way of illustration only:

All temperatures are in °C.

EXAMPLE 1

11β-Bromo-oestr-4-ene-3,17-dione a. Using methylene chloride as solvent. A solution of 11α-hydroxy-oestr-4-ene-3,17-dione (576 mg., 2 mmole) and dry lithium bromide (650 mg., 7.6 mmole) in methylene chloride (10 ml.) at 0° under nitrogen was treated with N-(2-chloro-1,1,2-trifluoroethyl)-diethylamine (0.5 ml., 3.1 mmole). The mixture was stirred for 40 min. during which time the temperature was allowed to rise to 20°. The mixture was then poured into cold water and the product was extracted into chloroform. The extract was washed with water, dried and evaporated at below 40° in vacuo, finally at 20°/0.05 mm. The resulting red oil (1.1 g.) and that from another experiment were combined (2.2 g.). Purification by preparative thin layer chromatography on silica gel in benzene-ethyl acetate (7:3) gave 11β-bromo-oestr-4-ene-3,17-dione (792 mg., 57%) which crystallised from ether as plates (545 mg.) m.p. 134°–135°, $[\alpha]_D +211°$ (c 0.98, CHCl$_3$), $\lambda_{max.}^{EtOH}$ 238 nm. ($\epsilon$17,750) (Found: C, 61.4; H, 6.8; Br, 22.4%. $C_{18}H_{23}BrO_2$ requires C, 61.5; H, 6.55; Br, 22.8%).

b. Using tetrahydrofuran as solvent. 11α-Hydroxyoestr-4-en-3,17-dione (500 mg., 1.74 mmole) and lithium bromide (650 mg., 7.6 mmole) in tetrahydrofuran (12.5 ml.) at 0° under nitrogen were heated with N-(2-chloro-1,1,2-trifluoroethyl)-diethylamine (0.5 ml. 3.1 mmole). The cooling bath was then removed and the mixture was stirred at ambient temperature for 90 min. Further lithium bromide (300 mg.) and halogenating reagent(0.25 ml.) were added. After further stirring, the product was isolated as described in (a) and the resulting red oil (558 mg.) was partially purified by preparative thin layer chromatography to give crude 11β-bromo-oestr-4-ene-3,17-dione (131 mg.), $\lambda_{max.}^{EtOH}$ 236,298 nm ($E_1^1$ 409, 63) (Found: Br, 15.4%).

Example 2

11β-Bromo-3-ethosyoestra-3,5-dien-17-one

A solution of 11β-bromo-oestr-4-ene-3,17-dione (1.2 g., 3.4 mmole), triethyl orthoformate (1.25 ml., 7.5 mmole) and toluene-p-sulphonic acid monohydrate (16 mg.) in dioxan (7 ml.) was stirred under nitrogen at 20° for 80 min. Pyridine (0.5 ml.), water (70 ml.) and saturated aqueous sodium hydrogen carbonate (1 ml.) were added and the product was extracted into ether.

The extract was washed with water, dried, and evaporated to give a yellow solid (1.2 g.) which was crystallised from ether-petroleum ether to yield the crude enol ether (431 mg.) $\lambda_{max.}^{EtOH}$ 244 nm ($\epsilon$ ca. 20,000).

EXAMPLE 3

11β-Bromo-3-ethoxy-17α-ethynyloestra-3,5-dien-17β-ol

Purified acetylene was passed through a boiling solution of sodamide (from 250 mg. sodium) in liquid ammonia (60 ml.) for 3 hr. The enol ether (390 mg, prepared in Example 2,) in tetrahydrofuran (40 ml.) was added dropwise with stirring over 30 min. The mixture was then stirred under reflux for 17 hr. with acetylene bubbline through slowly. Saturated aqueous ammonium chloride (2 ml.) was added and the ammonia was allowed to evaporate. Water was added and the product was extracted into ether. The extract was washed with water, dried and evaporated to give crude 11β-bromo-3-ethoxy-17α-ethynyloestra-3,5-dien-17β-ol (352 mg.) which showed infra-red absorption characteristic of the 3:5-diene and ethynyl groups.

EXAMPLE 4

11βBromo-17α-ethynyl-17β-hydroxyoestr-4-en-3-one

The enol ether from Example 3 (347 mg.) was treated with methanol (20ml.) and aqueous N-hydrochloric acid (2 ml.) for 1 hr. at 20°. The solution was then concentrated in vacuo, water was added and the product was isolated with chloroform. The crude product (326 mg.) was crystallised from ether to give 11β-bromo-17α-ethynyl-17β-hydroxyoestr-4-en-3-one (198 mg.), m.p. 145°–150° dec. Further crystallisation of 170 mg. from aqueous methanol gave the analytical sample (109 mg.), m.p. 145°–149°. $[\alpha]_D$ + 95.5°, $\lambda_{max}^{EtOH}$ 238 nm. ($\epsilon$17,000) (Found: C, 63.7; H, 6.7; H, 6.7; Br, 19.3. $C_{20}H_{25}BrO_2$ requires C, 63.6; H, 6.7; Br, 21.2%).

EXAMPLE 5

$C_{20}H_{27}BrO_3$ requires C, 60.8; H, 6.9; Br, 20.2%).

EXAMPLE 6

17α-Acetoxy-11β-bromo-19-norpregn-4-ene-3,20-dione

11β-Bromo-17α-hydroxy-19-norpregn-4-ene-3,20-dione (600 mg., 1.5 mmole) in methylene chloride (20 ml.) was treated with acetic anhydride (12 ml.) and toluene-p-sulphonic acid monohydrate (600 mg.) and the mixture was stirred for 5 hr. at 20°. Pyridine (1.8 ml.) and water (40 ml.) were added and the product was extracted with ether. The extract was washed with water, dried and evaporated to give crude 3,17α-diacetoxy-11β-bromo-19-norpregn-3,5-dien-20-one (780 mg.) which was dried in vacuo over sodium hydroxide.

A solution of the crude diacetate in tetrahydrofuran (30 ml.) and methanol (15 ml.) was stirred under nitrogen and treated dropwise with aqueous N sodium hydroxide (ca. 1.3 ml.) during 10 min. to pH ca. 8. After a further 20 min, water (40 ml.) was added and the product was isolated with ether. The crude product (613 mg.) was purified by preparative thin layer chromatography on silica gel in benzene-ethyl acetate to give 17α-acetoxy-11β-bromo-19-norpregn-4-ene-3,20-dione (316 mg.). The analytical sample had m.p. 164°–166° (solvate, from ethyl acetate), $[\alpha]_D$ + 92° (c 0.89, CHCl$_3$), $\lambda_{max}^{EtOH}$ 238 nm ($\epsilon$ 18,850) (Found: 6, 59.4; H, 6.5; Br, 17.0 $C_{20}H_{29}BrO_4$. 0.5 $C_4H_8O_2$ requires C, 59.9; H. 6.9; Br, 16.8%).

EXAMPLE 7

3α-Bromo-5α-cholestane

5α-Cholestan-3βol (250 mg.) in tetrahydroduran (5 ml.) was treated with lithium bromide (1.25 g.) and N-(2-chloro-1,1,2-trifluoroethyl)-diethylamine (0.5 ml.) and after 75 mins the reaction mixture was poured into water. The product was isolated with chloroform and purified by thin-layer chromatography to give 3α-bromo-5α-cholestane (86 mg.), m.p. 88°–93°.

EXAMPLE 8

11β-Bromo-17α-hydroxy-19-norpregn-4-ene-3,20-dione

11α,17α-Dihydroxy-19-norpregn-4-ene-3,20-dione (166 mg., 0.5 m.mole) was refluxed with bromotrichloromethane (0.1 ml., 1 m.mole), triphenylphosphine (524 mg., 2 m.mole), chloroform (0.1 ml.) and tetrahydrofuran (5 ml.) for 6 hours under nitrogen. The mixture was cooled and water added. Extraction with ether afforded a pale yellow soild (574 mg.). Preparative thin layer chromatography on Kieselgel PF using benzene-ethyl acetate (3:7) gave a semi-crystalline product (37 mg.), consisting of 11β-bromo-17α-hydroxy-19-norpregn-4-ene-3,20-dione and 17α-hydroxy-19-norpregna-4,9(10)-dien-3-one, $\lambda_{max}$ 239, 302 nm ($E_{1\ cm.}^{1\%}$ 300, 109). The n.m.r. and i.r. spectra were consistent with the presence of these compounds in a ratio of ca. 4:1 respectively as indicated by the u.v. spectrum.

EXAMPLE 9

11α,17α-Dihydroxy-19-norpregna-4,6-diene-3,20-dione

11α,17α-Dihydroxy-19-norpregn-4-ene-3,20-dione (6 g.) was dissolved in isopropyl alcohol (100 ml.) and p-toluene sulphonic acid (120 mg.) and ethyl orthoformate (6 ml.) were added. The solution was allowed to stand at room temperature under nitrogen for 20 minutes, it was then poured into sodium bicarbonate solution and extracted with ether, washed with water, dried (MgSO$_4$) and evaporated to give the isopropyl enol ether as a froth (7 g.), $\lambda_{max}$ (in EtOH) 244 nm.

The isopropyl enol ether was dissolved in acetonitrile (100 ml.) and added to manganese dioxide (30 g.) in methylene chloride (50 ml.). The mixture was stirred under nitrogen for 45 minutes, it was then filtered through Kieselguhr, the Kieselguhr was washed with ethyl acetate and ethanol and the total filtration evaporated. Trituration with methyl acetate and crystallisation from acetone/petroleum ether (b.p. 40°–60°) gave 11α,17α-dihydroxy-19-norpregna-4,6-diene-3,20-dione (1.3 g.), m.p. 238°–241°, [α]$_D$ − 66° (c 0.7 in dioxan) λ$_{max}$ (in EtOH) 284.5 nm.

EXAMPLE 10

11β-Bromo-17α-hydroxy-19-norpregna-4,6-diene-3,20-dione

11α,17α-Dihydroxy-19-norpregna-4,6-diene-3,20-dione (0.5 g) in stirred dry tetrahydrofuran (10 ml.) was treated at room temperature with anhydrous lithium bromide (0.5 g.) and N-(2-chloro-1,1,2-trifluoroethyl)-diethylamine (0.5 ml.). After 2 hours, the mixture was partitioned between water and methylene chloride. The organic layer was evaporated and the residue was purified by preparative layer chromatography to yield the title compound (0.25 g., 42%), m.p. 154° (dec.), λ$_{max}$ (in EtOH) 280 nm (ε 26,700).

EXAMPLE 11

17α-Acetoxy-11β-bromo-19-norpregna-4,6-diene-3,20-dione

11β-Bromo-17α-hydroxy-19-norepregna-4,6-diene-3,20-dione (0.23 g.) in glacial acetic acid (2.3 ml.) was treated with trifluoroacetic anhydride (0.46 ml.). After 2 hours at 80° the reaction mixture was partitioned between water and methylene chloride. The organic layer was evaporated and the residue was partially purified by preparative layer chromatography to yield the crude acetate (0.17 g., 66%), λ$_{max}$ (in EtOH) 279 nm, (E$_1$ $_{cm}^{1\%}$ 604).

The following Examples illustrate pharmaceutical compositions according to the invention:

A. Oral tablets (continuous daily administration)
(a) 17α-acetoxy-11β-bromo-19 norpregn-
   4-ene-3,20-dione (microfine)      0.25   mg
   Starch (60 mesh)                   10.0   mg
   Lactose (60 mesh)                  64.0   mg
   Magnesium stearate (100 mesh.)     0.75   mg Ball mill (a) with twice the weight of lactose to a very fine powder all below 5 microns. Dilute with 5 successive portions of lactose, milling between each. Triturate with the starch and blend in the remaining lactose to form a homogeneous powder. Granulate with 50% ethanol in water and pass through a No. 12 mesh B.S. sieve. Dry the granules to constant weight and pass through a No. 20 mesh B.S. sieve and blend in the magnesium stearate prior to compression at 75 mg. per tablet on 7/32 inch punches, preferably engraved punches for identification of the tablets. Pressure is adjusted so that the tablets disintegrate within 10 mins. The tablets may be film coated for colour distinction and should be released for public use, only in specially designed packs to strictly regulate the use of the tablets.

B. Oral tablets (for intermittent administration)
(b) 17α-acetoxy-11β-bromo-19-norpregn-4-
   ene-3,20-dione (microfine)      2.0    mg
(c) Ethynyl oestradiol (microfine)  0.05   mg
   Starch (60 mesh)                 10.5   mg
   Lactose (60 mesh)                66.65  mg
   Magnesium stearate (100 mesh)    0.8    mg Ball mill (b) and (c) separately with very small quantities of lactose, mix together and proceed as in example A treating the mixture of (b) and (c) as for (a) in example A. The tablets will of course be compressed on different punches at 80 mg per tablet, and may be subsequently coated if required.

C. Long Acting Injection (Deep intra muscular)
(d) 17α-Acetoxy-11β-bromo-19-norpregn-
   4-ene-3,20-dione                   10.0   mg
   Aluminium stearate 1.5% w/w
   gelled in winterised arachis oil to 0.5    ml.
   produce Prepare the base by heating together the aluminium stearate dispersed in the arachis oil until solution is effected and thickening occurs about 90°C. Close the vessel and with continued stirring, sterilise the base by heating at 150°C for 1 hour. Cool rapidly to 55°C. Aseptically triturate the (d) with the base and pass through a refining mill and premix to obtain a homogeneous dispersion. Pack into unit cartridges.

D. Aqueous Injection (long acting)
(e) 11β-Bromo-17α-ethynyl-17β-
   hydroxyoestr-4-en-3-one                10.0   mg
(f) Sodium carboxymethylcellulose         10     mg
(g) Nonex, 52
   (a polyethylene glycol oleate
   supplied by Union Carbide of Grafton
   St., London, W.1.)                     0.01   % w/v
                                          (in final
                                          injection)
(h) Formalised starch                     20     mg
Vehicle (in separate container)
A sterile sorbitol solution 10% w/w       1      ml Sterile (f) and (h) separately by dry heat. Dissolve (g) in a little chloroform, sterilise by filtration and disperse over the mixed, sterilised powders (f) and (h). Remove the chloroform and blend the powders in a ball mill to give a homogeneous mix. Prepare sterile crystals of (e) in 2 particle size ranges, approximately, 15–25 microns and 30–40 microns, taking about equal portions of each. Blend these crystals with the base and aseptically distribute 55 mgs of the resultant dry mix into sterile vials and close hermetically. Reconstitute the injection immediately before use, by adding 1 ml of the sorbitol vehicle to the dry mix and shaking to obtain a suspension.

E. Tablet Implant
(j) 17α-acetoxy-11β-bromo-19-norpregn-
   4-ene-3,20-dione (microfine)           60 mg Tablet implants may be prepared by conventional methods such as heavy compression of the pure sterile material or by fusion, by melting and casting into shape in a mould. The implants are packed into sterile moisture proof containers.

The quantity of active ingredient in an implant will be related to the duration required; shape and surface area and average absorption required from the formulation.

F. Intravaginal pessary for veterinary use. (For sheep)
(k) 17α-acetoxy-11β-bromo-19-norprena-
   4-ene-3,20-dione                       20.0 mgs Dissolve (k) in sufficient ethanol and sterilise by filtration. The pessaries or tampons may be prepared in a conventional manner by absorbing the required amount of ethanolic solution onto sterile gauze rolls or fine porous plastic sponges, evaporating the ethanol under vacuum and protecting the vaginal insert in a sterile pack, suitable for administration. The dosage required for veterinary preparations, will, of course, be related to the animal being treated.

We claim:

1. A 9α-unsubstituted-11β-bromo-19-nor-steriod of the androstane or pregnane series selected from the group consisting of those of the formula

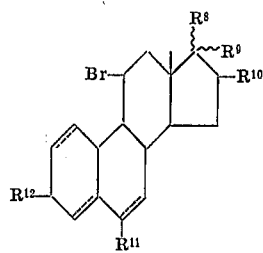

wherein the dotted lines between the 1,2-, 4,5-, and 6,7-positions indicate the presence of single or double bonds;

$R^8$ is a member selected from the group consisting of a hydrogen atom, an hydroxy group and a protected hydroxy group selected from the group consisting of an aliphatic acyloxy group having 1–9 carbon atoms in the aliphatic portion, a cycloaliphatic acyloxy group having up to 7 carbon atoms, a mono-carbocyclic aryl acyloxy group, a mono-carbocyclic araliphatic acyloxy group having 1–9 carbon atoms in the aliphatic portion, an alkoxy group having 1–5 carbon atoms and a monocyclic aralkoxy or aryloxy group;

$R^9$ is a hydrogen atom, an acetyl group, an aliphatic acyloxy acetyl group having 1–9 carbon atoms in said aliphatic group, a saturated aliphatic hydrocarbon group having 1–9 carbon atoms, an unsaturated aliphatic hydrocarbon group having 1–9 carbon atoms, or a saturated or unsaturated aliphatic hydrocarbon having 1–9 carbon atoms substituted by a member of the class consisting of a chlorine atom, an hydroxy group and an aliphatic acyloxy group having 1–9 carbon atoms, or $R^8$ and $R^9$ together represent a member selected from the group consisting of an oxo group, a ketal and an enol ether group, provided that $R^8$ and $R^9$ are not both hydrogen;

$R^{10}$ represents a member selected from the group consisting of a methyl group, a methoxy group, a methylene group and a hydrogen atom; or $R^8$ and $R^{10}$ together represent a 16,17-methylene group or a carbon-carbon bond;

$R^{11}$ represents a member selected from the group consisting of a methyl group, a chlorine atom, a fluorine atom and a hydrogen atom; and $R^{12}$ represents a member selected from the group consisting of an oxo group, a ketal group, a hydroxy group and a protected hydroxy group selected from the group consisting of an aliphatic acyloxy group having 1–9 carbon atoms in the aliphatic portion, a cycloaliphatic acyloxy group having up to 7 carbon atoms, a mono-carbocyclic aryl acyloxy group, a mono-carbocyclic araliphatic acyloxy group having 1–9 carbon atoms in the aliphatic portion, an alkoxy group having 1–5 carbon atoms and a mono-cyclic aralkoxy or aryloxy group; and where $R^{12}$ represents an oxo group, the enol ethers or esters thereof.

2. A steroid as claimed in claim 1 in which the ketal groups are ethylenedioxy groups and in which the enol ether groups are enol methyl ether or enol ethyl ether groups.

3. A steroid as claimed in claim 1 in which the aliphatic group is a methyl, ethyl, propyl, vinyl, 2-methyl-prop2-enyl, 1-methyl-prop-2-enyl, but-2-enyl, allyl, ethynyl or chloroethynyl group.

4. The compound of claim 1 which is 11β-bromo oestr-4-ene-3, 17-dione.

5. The compound of claim 1 which is 17α-acetoxy-11β-bromo-19-norpregn-4-ene-3,20-dione.

6. The compound of claim 1 which is 11β-bromo-17α-ethynyl-17β-hydroxyoestr-4-en-3-one.

7. The compound of claim 1 which is 11β-bromo-3-ethoxy-17α-ethynyloestra-3,5-dien-17β-ol.

8. The compound of claim 1 which is 17α-acetoxy-11β-bromo-19-norpregna-4,6-diene-3,20-dione.

9. A process for the preparation of a 9α-unsubstituted 11β-bromo-19-nor-steroid as defined in claim 1 in which a corresponding 9α-unsubstituted-11α-hydroxy-19-nor-steroid is reacted (a) with a reagent of the formula

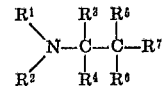

where $R^1$ and $R^2$, which are the same or different, are alkyl groups having 1–8 carbon atoms or aralkyl or aryl groups or together with the nitrogen atom to which they are attached, comprise a heterocyclic radical which can contain further hetero-atoms.

$R^3$ is a bromine or fluorine atom, $R^4$ is a bromine or fluorine atom, and $R^5$ is a hydrogen or $R^4$ and $R^5$ together represent a carbon-carbon bond;

$R^6$ is a chlorine, bromine or fluorine atom and $R^7$ is a chlorine, bromine or fluorine atom or a trifluoromethyl group, the reaction being effected in the presence of bromide ions when neither $R^3$ nor $R^4$ is bromine; or (b) with a triaryl-phospine or -phosphite and bromine or a bromoalkane.

10. A process as claimed in claim 9 in which the source of bromide ions in reaction (a) is a salt soluble in organic solvents, but having a cationic portion inert to the reagent.

* * * * *

PO-1050
(5/69)

UNITED STATES PATENT OFFICE
CERTIFICATE OF CORRECTION

Patent No. 3,875,148    Dated April 1, 1975

Inventor(s) JOSEPH ELKS et al

It is certified that error appears in the above-identified patent and that said Letters Patent are hereby corrected as shown below:

Title page, column 1, line 8, "Glaxo Laboratories"

should read --Glaxo Laboratories Limited--.

Signed and Sealed this second Day of September 1975

[SEAL]

Attest:

RUTH C. MASON
Attesting Officer

C. MARSHALL DANN
Commissioner of Patents and Trademarks